June 1, 1926.
E. LEWIS
1,586,906
KNIFE OR CUTTER
Filed Jan. 25, 1924
2 Sheets-Sheet 1
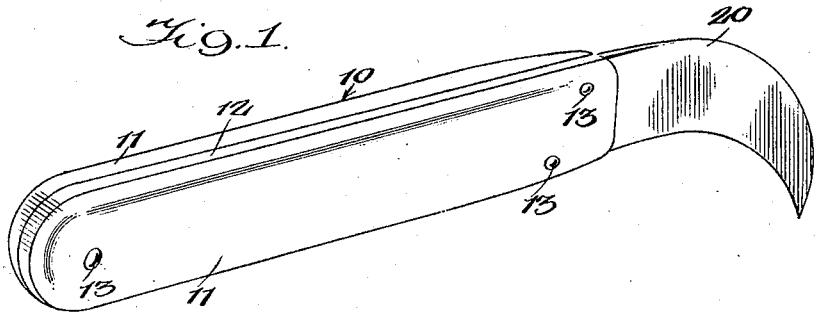
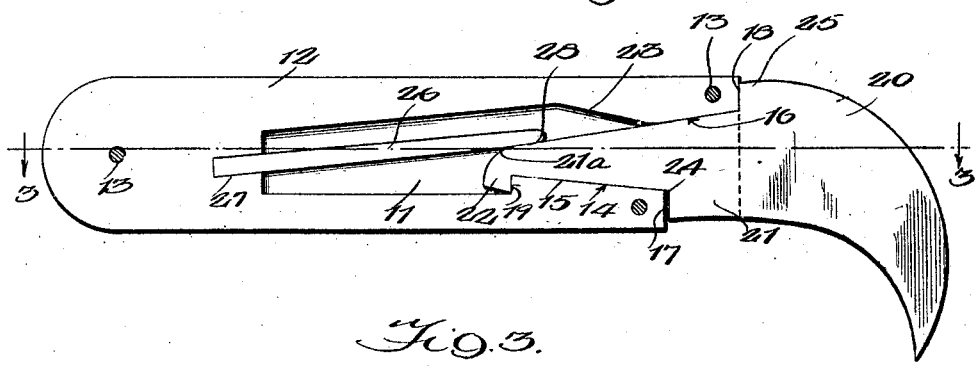
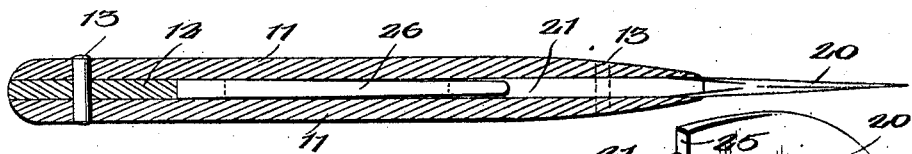
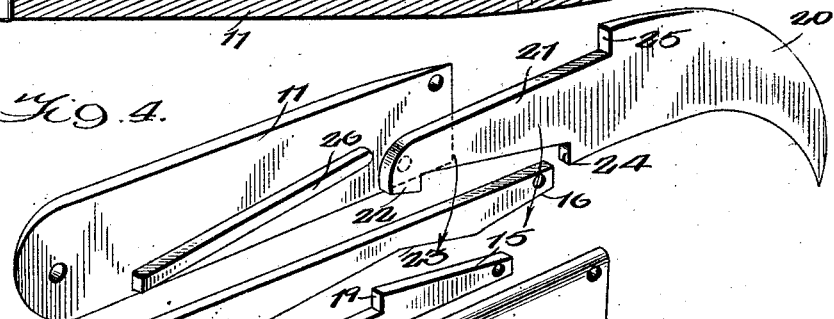
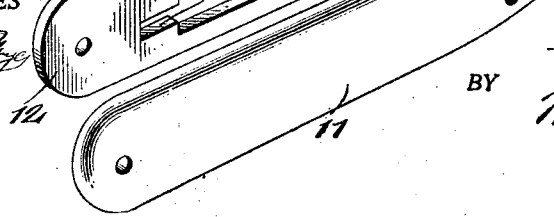
WITNESSES
INVENTOR
E. Lewis,
BY
ATTORNEYS June 1, 1926.
E. LEWIS
KNIFE OR CUTTER
Filed Jan. 25, 1924
1,586,906
2 Sheets-Sheet 2
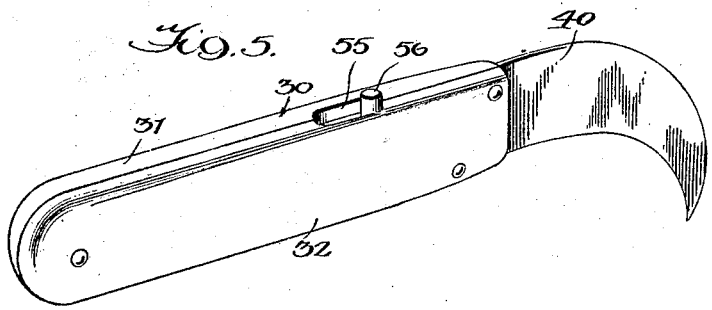
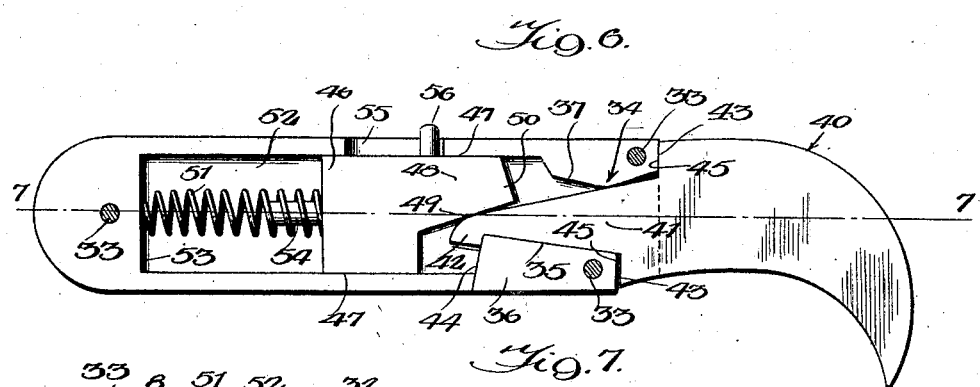
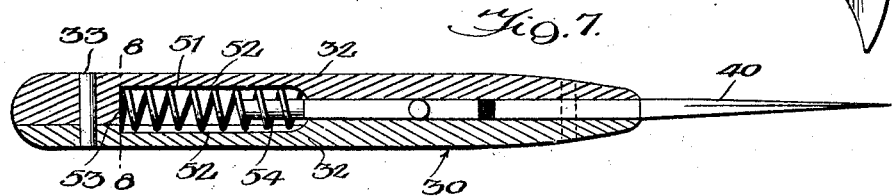
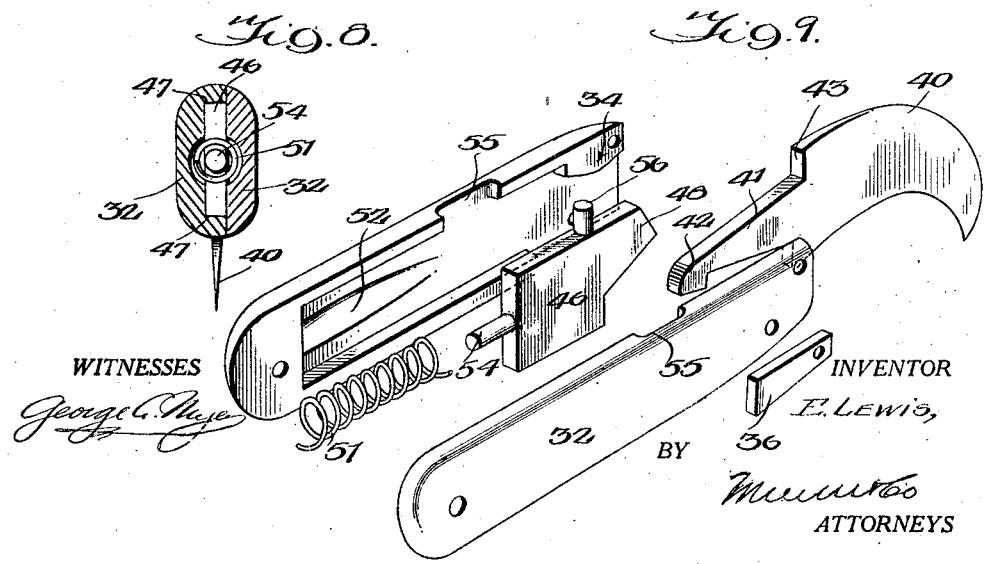
WITNESSES
George C. Nye
INVENTOR
E. Lewis,
BY
ATTORNEYS Patented June 1, 1926.

1,586,906

UNITED STATES PATENT OFFICE.

ELIAS LEWIS, OF TERRE HAUTE, INDIANA.

KNIFE OR CUTTER.

Application filed January 25, 1924. Serial No. 688,579.

This invention relates to an improvement in knives or cutters, and has for its object to provide an improved knife or cutter wherein the blade is detachably mounted in the handle in such manner that it is held and secured in position to effectively carry out any cutting operation and yet may be readily disassembled from the handle when desired.

A further object is to provide a knife or cutter having the foregoing advantages and capacities and which is of simple and durable construction, reliable and safe in operation and easy and comparatively inexpensive to manufacture.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a perspective view, showing one embodiment of the invention;

Figure 2 is a view in side elevation, showing the embodiment illustrated in Figure 1 with one of its side plates removed;

Figure 3 is a view in section on line 3—3 of Figure 2;

Figure 4 is a group view in perspective, showing the parts of the knife and handle of the embodiment illustrated in Figures 1, 2 and 3 prior to assembly;

Figure 5 is a perspective view of another embodiment of the invention;

Figure 6 is a view in side elevation, showing the embodiment illustrated in Figure 5 with one of its side plates removed;

Figure 7 is a view in section on line 7—7 of Figure 6;

Figure 8 is a similar view on line 8—8 of Figure 7; and

Figure 9 is a group view in perspective, showing the parts of the embodiment illustrated in Figures 5 to 8 prior to assembly.

Referring to the drawings and more particularly to Figures 1 to 4, inclusive, the numeral 10 designates a handle which is made up of a pair of side plates 11 and a filler plate 12 interposed between the side plates 11. The side plates 11 and filler plate 12 are secured together in assembly by rivets 13 or other suitable fastening devices such as screws or the like. The filler plate 12 is cut away as shown in Figures 2, 3 and 4 so that in the assembly this filler plate and the side plates define a socket designated generally at 14. This socket is defined in part by bearing surfaces 15 and 16 provided on the filler plate. The bearing surface 16 is of less extent than the bearing surface 15. The bearing surface 15 is disposed rearwardly of the surface 16, this surface 15 being spaced rearwardly from the forward end of the handle. The ends of the portions of the filler plate that present the bearing surfaces 15 and 16 are flat and plane and constitute stops which are designated at 17 and 18, respectively.

A plate designated generally at 20 is provided and is formed with a tang 21 which is inserted in the socket 14 when the blade is assembled with the handle. At its end the tang is provided with a laterally offset lug 22 which is engageable with a shoulder 19 provided on the filler plate 12 rearwardly of the bearing surface 15. In order to permit of assembly and disassembly of the blade with the handle, the filler plate 12 is cut away, as at 23, to provide the necessary clearance to accommodate the tang 21 in its movement during assembly and disassembly. The tang 21 is provided with stop shoulders 24 and 25 which engage the stops 17 and 18, respectively, of the filler plate to limit the inward movement of the tang in the socket. The tang 21 and its shoulders and lugs are a sufficiently loose fit in the socket to permit of assembly and disassembly and yet the shoulders 18 and 25 are engageable to provide a rigid abutment for the knife as against forces acting on the knife when the same is cutting.

Means is provided for releasably holding the lug 22 engaged with the shoulder 19 and preferably this means comprises a resilient or spring locking bar 26 having one end fitted and secured in a seat 27 provided therefor in the filler plate and having its opposite end arranged to bear upon the tang 21, as indicated at 28, in Figure 2.

With this form of the invention, when the tang 21 of the plate 20 is inserted in the socket 46 the rounded surface 21$^a$ engages the rounded end of the spring locking bar 26 and presses the same upwardly until the lug 22 snaps into position behind the shoulder 19 under the influence of the spring locking bar 26. With the lug 22 engaged with the shoulder 19 outward movement of the plate is prevented and inward movement is prevented by the engagement of the stop shoulders 24 and 25 with the stops 17 and 18. The tendency of the cutting action to move the plate is resisted by the combined action of the bearing surfaces 15 and 16. When it is desired to remove the plate from the handle the same is swung in a clockwise direction, as viewed in Figure 2, the clearance 23 permitting this movement. Of course the spring locking bar 26 resists clockwise movement of the plate 20 as viewed in Figure 2 but this bar yields to the extent necessary to permit of disengagement of the lug 22 of the shoulder 19 and withdrawal of the tang 21 from the socket 14.

In the form of the invention shown in Figures 5 to 9, inclusive, the handle is designated generally at 30 and is made up of a pair of plate members 31 and 32 secured together in assembly by rivets or other suitable fastening means 33. One of the plate members 32 is preferably made heavier than the other and is hollowed out to provide a socket designated generally at 34. The socket 34 is preferably defined by a flat bearing surface 35 which may be provided on a separate piece 36 in between the plates 32 and suitably secured in position. The wall of the socket opposite the bearing surface 35 has a double beveled or incline 37 to provide a line bearing contact and the requisite clearance as will be presently understood.

A blade designated generally at 40 is provided and as in the embodiment previously described is formed with an integral tang 41 having an offset lug 42 and stop shoulders 43. The lug 42 is cooperable with a shoulder 44 and the stop shoulders 43 are cooperable with stops 45. The tang 41 with its shoulders 43 and its lug 42 are a sufficiently loose fit in the socket 34 to permit of assembly and disassembly and yet the shoulders 43 and 45 are engageable to provide a rigid abutment for the knife when cutting.

Means is employed for releasably securing the lug 42 of the tang 41 of the plate in engagement with the shoulder 44 so as to hold the blade in assembly with the handle. In this embodiment of the invention this means includes a reciprocable locking plate 46 mounted in guideways 47 provided in one of the plates 32. The locking plate 46 includes a finger 48 having a surface 49 engageable with the tang of the blade to hold the lug 42 in engagement with the shoulder 44. This finger 48 also includes a surface 50 in which the tang or the lug thereof is engageable when the tang is inserted in the socket for the purpose of pressing the plate 46 and its finger 48 rearwardly in guideways 47 to such an extent as to permit the lug 42 and shoulder 44 to come into engagement after which the plate 46 is automatically repositioned to engage the surface 49 of the finger 48 with the tang 41 of the blade. In order to carry out the last mentioned action, a coil spring 51 is provided and is accommodated in recesses 52 formed in the members 32. One end of the coil spring 51 abuts the rear wall 53 of the recesses 52 and the other end is engageable with the rear end of the plate 46 and is held to its proper action on said plate by means of a centering pin 54 connected to the plate and extending into the adjacent end of the coil spring.

In order to provide for release or detachment of the plate 40 from the handle the plate 30 is slotted, as at 55 and the plate 48 is provided with an operating pin 56 which projects through said slots 55 and exteriorly of the handle. Obviously, the pin 56 may be grasped and pulled rearwardly to disengage the finger 48 from the tang 41 and permit the plate to be rocked and withdrawn.

I claim:

1. A knife comprising a hollow handle having a socket at its forward end, the socket having plane and parallel side walls, a top wall made up of oppositely inclined surfaces and a bottom wall providing an elongated bearing surface, the bottom wall extending rearwardly beyond the top wall and terminating in a shoulder at its rear end, a blade having a tang insertable in the socket, the tang having a bearing surface engageable with the bearing surface of the socket and also having a lug engageable with the shoulder, the handle having stops at the forward end of the socket, the blade having shoulders engageable with the stop, and releasable means for holding the lug engaged with the shoulder.

2. A knife comprising a hollow handle having a socket at its forward end and also having a shoulder at the inner end of the socket, a blade having a tang insertable in the socket and engageable and disengageable with the shoulder by movements transversely of the socket, a rigid holding element slidably fitted in the handle for longitudinal movement but constrained against transverse movement, said holding element having a portion engageable with the tang to yieldably hold the lug of the tang engaged with the shoulder, and spring means for forcing the holding element to a position where said portion engages the tang.

ELIAS LEWIS.